United States Patent [19]

Johnson et al.

[11] Patent Number: 5,480,604
[45] Date of Patent: Jan. 2, 1996

[54] MOLDED SEAM FOR PAPERMAKERS FABRIC AND METHOD

[75] Inventors: C. Barry Johnson, Summeville; Rachel H. Kramer, Charleston, both of S.C.

[73] Assignee: Asten, Inc., Charleston, S.C.

[21] Appl. No.: 644,455

[22] Filed: Jan. 23, 1991

[51] Int. Cl.$^6$ .............................. B29C 45/00; B29D 5/00
[52] U.S. Cl. ................ 264/138; 264/154; 264/252; 264/254; 264/255; 264/257; 264/273; 264/274; 264/275; 264/279; 264/328.1; 264/328.7; 264/328.8
[58] Field of Search .................. 264/252, 254, 264/255, 257, 273, 274, 275, 279, 138, 152, 154, 155, 156, 160, 328.7, 328.11, 328.1, 328.8, DIG. 70; 162/358, 358.1–358.2; 139/DIG. 1, 383 AA, 383 R; 24/31 B, 31 F, 587, 588, 578, 31 L, 31 H, 33 R

[56] References Cited

U.S. PATENT DOCUMENTS

| | | | |
|---|---|---|---|
| 1,948,411 | 2/1934 | Asten | 24/33 R |
| 1,959,318 | 5/1934 | Sundback | 24/205 |
| 2,074,368 | 3/1937 | Comer | 264/257 X |
| 2,102,328 | 12/1937 | Morin et al. | 264/252 X |
| 2,178,984 | 11/1939 | Zimmerman | 24/588 X |
| 2,207,600 | 7/1940 | Seaver | 264/252 X |
| 2,297,070 | 9/1942 | Poux | 264/328.8 X |
| 2,440,960 | 5/1948 | Kuzmick | 264/252 X |
| 2,495,592 | 1/1950 | Morin | 264/252 |
| 2,523,463 | 9/1950 | Feitl | 264/275 X |
| 2,589,442 | 3/1952 | Siegrist | 264/257 X |
| 3,192,566 | 7/1965 | Ryser | 264/274 X |
| 3,338,285 | 8/1967 | Jaster | 24/587 X |
| 3,403,429 | 10/1968 | Smith | 24/204 |
| 3,461,511 | 8/1969 | Perina | 24/31 |
| 3,478,404 | 11/1969 | Plummer | 29/200 |
| 3,491,176 | 1/1970 | Wahlstrom | 264/252 X |
| 3,858,282 | 1/1975 | Plummer | 24/201 |
| 3,925,856 | 12/1975 | Plummer, III | 24/201 |
| 4,038,356 | 7/1977 | Beranek, Jr. et al. | 264/160 |
| 4,110,891 | 9/1978 | Akashi | 264/252 X |
| 4,160,055 | 7/1979 | Reed | 264/257 X |
| 4,185,718 | 1/1980 | Cawthra et al. | 264/152 |
| 4,321,227 | 3/1982 | Henfrey et al. | 264/328.7 X |
| 4,341,727 | 7/1982 | Landsness et al. | 264/156 X |
| 4,362,487 | 12/1982 | Takahashi | 264/273 X |
| 4,451,957 | 6/1984 | Lefferts et al. | 24/573 |
| 4,537,658 | 8/1985 | Albert | 162/348 |
| 4,594,210 | 6/1986 | Vittone et al. | 264/160 X |
| 4,695,498 | 9/1987 | Sarrazin et al. | 428/221 X |
| 4,777,072 | 10/1988 | Cason, Jr. | 428/120 |
| 4,791,708 | 12/1988 | Smolens | 24/33 C |
| 4,806,405 | 2/1989 | Liebl | 264/328.8 X |
| 4,824,525 | 4/1989 | Penven | 162/358 |
| 4,830,809 | 5/1989 | Liebl | 264/160 X |
| 4,862,926 | 9/1989 | Barrette et al. | 162/348 X |
| 4,917,937 | 4/1990 | Lappanen et al. | 428/196 |
| 4,921,671 | 5/1990 | Staheli | 264/160 X |
| 4,979,288 | 12/1990 | Mayerhofer | 264/252 X |
| 5,045,250 | 9/1991 | Brussel | 264/152 X |
| 5,059,373 | 10/1991 | Hirabayashi | 264/254 X |

FOREIGN PATENT DOCUMENTS

| | | | |
|---|---|---|---|
| 235679 | 9/1964 | Germany . | |
| 1930556 | 12/1970 | Germany . | |
| 2319806 | 11/1974 | Germany | 24/31 R |
| 2345414 | 3/1975 | Germany | 24/31 R |
| 0285348 | 11/1988 | Japan | 24/31 R |
| 1182216 | 9/1985 | U.S.S.R. | 24/31 R |
| 707726 | 4/1954 | United Kingdom . | |
| 2231838 | 5/1989 | United Kingdom . | |

*Primary Examiner*—Karen Aftergut
*Attorney, Agent, or Firm*—Volpe and Koenig

[57] ABSTRACT

A seam construction for a papermakers fabric in which mating seam components are molded onto opposite ends of the fabric. The seam is assembled by matingly engaging the seam components molded onto the respective fabric end to define a seam having a caliper substantially equal to the caliper of the fabric. Preferably, the seam components are male and female and become positively locked when the seam ends are joined together.

11 Claims, 2 Drawing Sheets

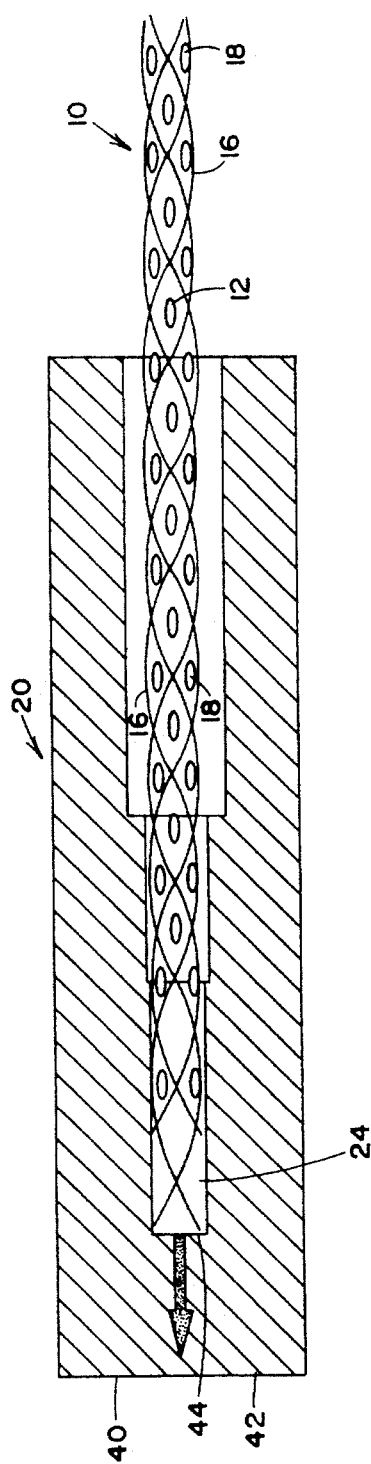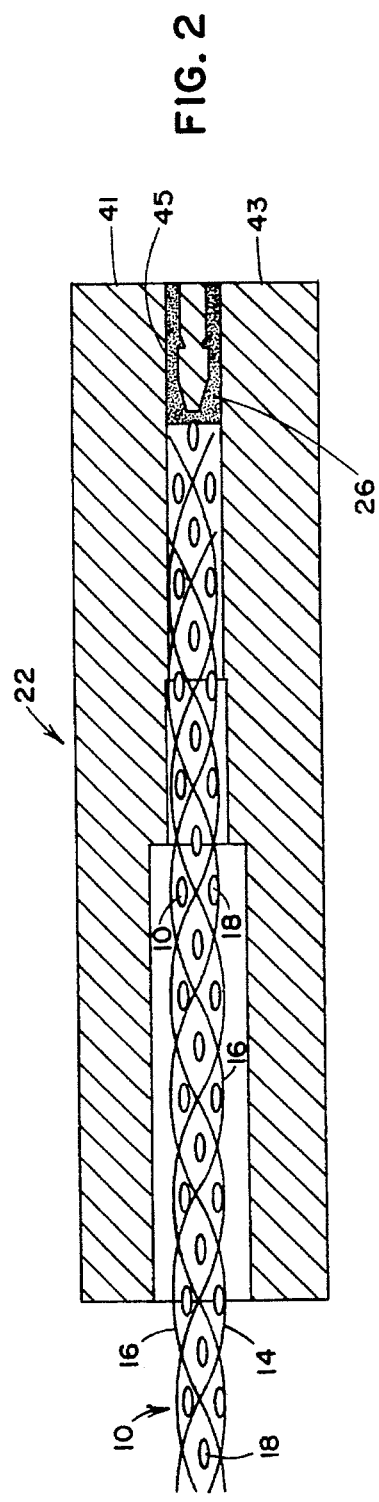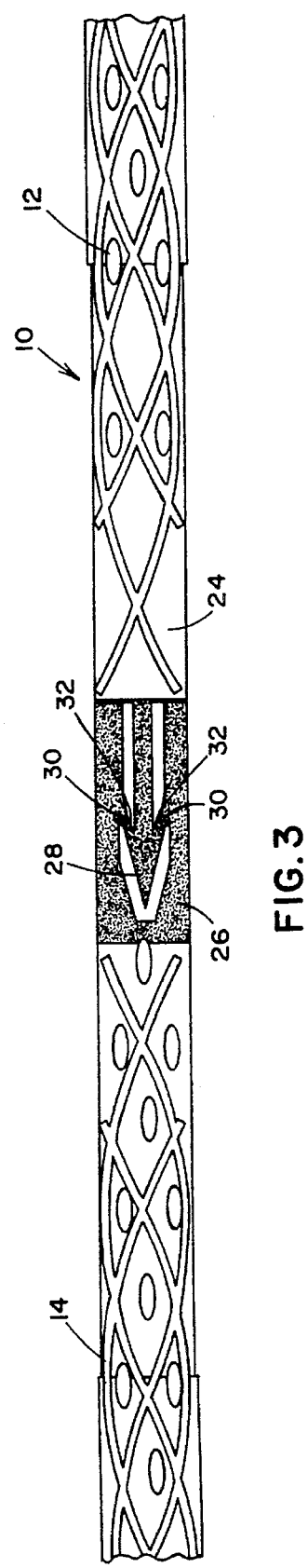

MOLDED SEAM FOR PAPERMAKERS FABRIC AND METHOD

The present invention relates to papermakers fabrics and in particular to fabrics which are seamed to provide a continuous belt when installed on papermaking equipment.

BACKGROUND OF THE INVENTION

Papermakers fabrics are used in the manufacture of paper products to assist in the formation, dewatering and drying of the paper product. Conventionally, papermakers fabrics are installed onto papermaking equipment to form an endless belt. Unless the papermakers fabric is woven endless, the papermakers fabric is installed by threading one end through the papermaking equipment and then seaming that end with the opposite end in situ on the papermaking equipment to form an endless belt.

A variety of techniques for creating seams for papermakers fabrics are known in the art. For example, U.S. Pat. Nos. 4,695,498; 4,791,708; 4,862,926; 4,824,525; and 4,846,231 which are assigned to the assignee of the present invention disclose various seams for papermakers fabrics which are known in the art.

Conventional seams, such as pin seams, may require labor intensive backweaving of end yarns to form seaming loops in the construction of the seam. The assembly of such seams requires precise registration to intermesh the seaming loops of the opposing fabric ends to seam the fabric by the insertion of a pintle through the intermeshed loops. It would be highly desirable to provide a seam structure for a papermakers fabric which is readily manufactured as well as easy to assemble during the seaming process.

OBJECTS AND SUMMARY OF THE PRESENT INVENTION

The present invention provides a seam construction for a papermakers fabric wherein mating seam components are molded onto opposite ends of the fabric. The seam is assembled by matingly engaging the seam components molded onto the respective fabric ends. Preferably, the seam components are male and female and become positively locked when the seam ends are joined together.

Other details and advantages of the present invention are set forth in more detail below in conjunction with a description of a presently preferred embodiment.

BRIEF DESCRIPTION OF THE DRAWINGS

FIG. 1 is a cross section of one end of a papermakers fabric within a mold for a male seam component;

FIG. 2 is a cross section of the opposite end of the papermakers fabric depicted in FIG. 1 within a mold for a female seam component;

FIG. 3 is a cross section of the opposing ends of the papermakers fabric shown in FIGS. 1 and 2 seamed together;

DETAILED DESCRIPTION OF THE PREFERRED EMBODIMENT

Figure 4:
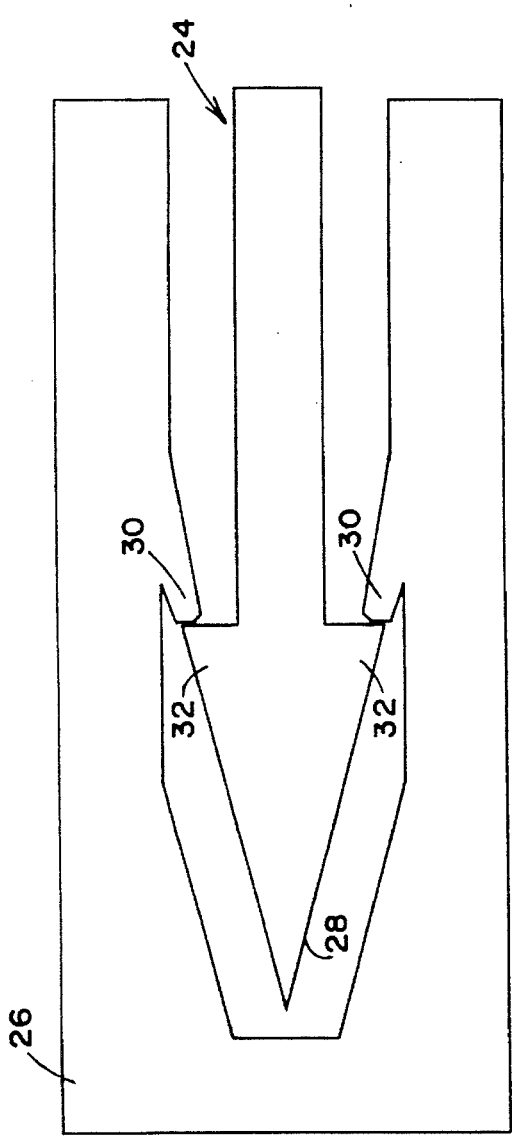
FIG. 4 is an enlarged cross section of the mated seam components shown in FIGS. 1 and 2.

With reference to FIGS. 1 and 2, there is shown a papermakers fabric 10 having opposing ends 12, 14, respectively. The body of fabric 10 is comprised of machine direction yarns 16 and cross machine direction yarns (or picks) 18.

Complementary male and female molds 20, 22, respectively, are provided to form male and female seam components 24, 26 on the opposing fabric ends 12, 14 respectively.

After the respective male and female molded seam components are formed on the respective fabric ends, the seaming of the papermakers fabric 10 is easily accomplished by matingly engaging the male molded component 24 with the female molded component 26 as shown in FIG. 3.

Preferably, the male component has a tapered leading end 28 to facilitate the mating engagement of the seamed components 24, 26. The female seam component 26 preferably includes resilient internal protrusions 30 which further facilitates the insertion of the tapered edge 28 of the male component 24 within the female component 26. Shoulders 32 are also preferably defined on the male component. As best seen in FIG. 4, the male component shoulders 32 in cooperation with female component protrusions 30 provide positive locking of the male seam component within the female seam component when the fabric is seamed.

The manufacture of the body of the papermakers fabric 10 is made in accordance with conventional practice to achieve a desired permeability and caliper. The inventive seam is made by initially preparing the opposing ends of the fabric which includes cutting the fabric to a desired length. In addition to evenly cutting the fabric across its width, preparation of the fabric ends may include the deletion of picks or individual machine direction yarn ends, removal of crimp, and activation and/or priming of the fabric ends. For example, the deletion of selected picks from fabric end 12, as shown in FIG. 1, permits additional plastic material to flow within the fabric weave to provide a stronger physical locking of the molded plastic onto the interwoven yarns of the fabric. Accordingly, the molded seam component relies upon the physical adherence of the molded material onto the substrate fabric yarns to a greater degree than the chemical adhesion between the molded material and the yarns.

Preferably, the machine direction tensile strength of the molded interconnection with the fabric yarns is at least 200 pounds per linear inch. Additionally, the tensile strength of the seam coupling of the opposing mated seam components is also at least 200 pounds per inch.

Preferably the molds 20, 22 are constructed using conventional materials and techniques. For example, the core and cavities would be made from a combination of steel alloys and non-ferrous metals, with a hard, smooth surface on the cavity. The molds have appropriate runners and gates designed to allow the largest segments to be molded in an efficient manner. Cooling and heating capabilities of the mold are designed to achieve a low cycle time in the molding operation.

Preferably, each mold 20, 22 has an upper half 40, 41 and a lower half 42, 43 respectively. The molds include guide pins (not shown) for closure of the upper and lower halves as well as alignment pins (not shown) for proper registration of the respective fabric ends within the respective male and female mold cavities 44, 45, respectively.

In operation, after the fabric ends have been prepared, one end of the fabric is placed within the separated halves of the male mold such that it is properly engaged with alignment pins (not shown). The mold halves are then closed and locked. An injection molding machine (not shown) is then utilized to inject a desired molten plastic into the closed mold in accordance with conventional molding techniques. The mold is held closed until cooling decompresses the melt. The mold is then disengaged from the injector and opened. The fabric end 12 having the seam component 24 molded thereon is then removed. The opposing fabric end 14 is processed in similar fashion to create the molded seamed component 26 on the opposite end of the fabric.

A conventional reciprocating screw injection molding machine capable of converting plastic pellets to a melt (plastication), storing the melt for a shot (accumulation), and pumping the melt into the mold (injection) is suitable for the molding process. The molding machine is selected such that the screw provides sufficient material to the mold at a desired viscosity and temperature with desired feed compression and metering during the injection molding operation.

Preferably a glass filled nylon resin commercially available from BASF and other suppliers is employed as the material to form the molded end components 24, 26. The nylon resin preferably has a processing temperature in the range of 500°–570° Fahrenheit requiring a pressure in the range of 10,000–20,000 PSI.

The mold preferably is designed to accommodate 1.4–1.8 percent linear shrinkage for such nylon resin. The nylon resin has a relatively high tensile strength of about 11,000 PSI and a high deflection temperature of about 412° Fahrenheit. The abrasion resistance of nylon facilitates the functionality of the seam components 24, 26 when the seamed fabric is run on papermaking equipment.

Those of ordinary skill in the art will recognize that other moldable materials will be suitable in the manufacture of the inventive molded seam components. The selection of material based upon the intended use of the fabric.

Papermakers fabrics typically range from about 60 inches to 420 inches in width. While it is possible to design a mold capable of molding the respective seam components 24, 26 across the entire width of the fabric in a single operation, a mold having a width less than the width of the fabric may be utilized. In such instance, the respective male and female seam components are molded in sections across the width of the fabric. The proper registration of the fabric within the mold is important to assure the creation of a uniform seam component across the width of the fabric, particularly where multiple injection molding operations are employed to create the respective seam components 24, 26.

Figure 5:
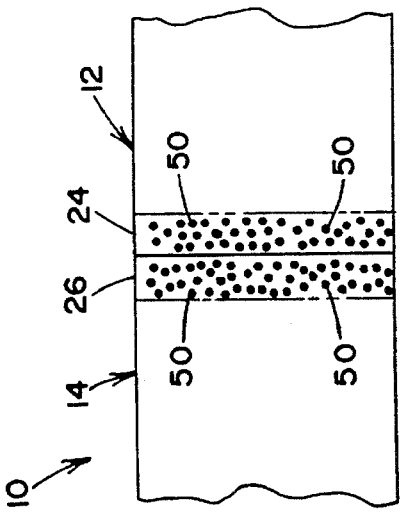
FIG. 5 is a top view of the seamed papermakers fabric shown in FIG. 3.

Uniform permeability of a papermakers fabric is an important characteristic of papermakers fabrics. As can be seen in FIG. 5, a uniform array of apertures 50 can be defined through the respective seam components 24, 26 to increase the permeability of the seam area. The size and spacing of the apertures are selected such that the permeability of the seam area is substantially the same as the permeability of the body of the fabric without rendering the tensile strength of the seam coupling and seam/fabric interconnection below the preferred minimum tensile strength criteria set forth above. The apertures 50 may be formed during molding or after the formation of the molded components.

Figure 6:
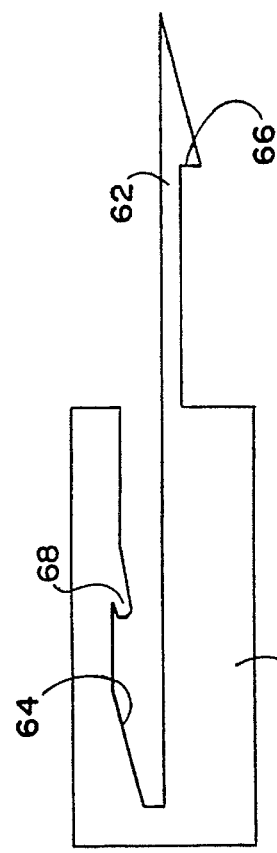
FIG. 6 is a cross section of an alternate configuration of the molded seam components.

In lieu of male and female seam component configurations, a single universal seam component configuration can be used such as depicted in FIG. 6. Universal seam component 60 includes both male portion 62 and female cavity 64. The male portion 62 includes a shoulder 66 and the female cavity 64 includes an internal protrusion 68. Respective shoulder portions 66 of each of two matingly engaged components 60 cooperate with respective internal protrusions 68 when lockingly engaged with each other.

While a specific embodiment has been disclosed, other variations and modifications will be apparent to those of ordinary skill in the art and are within the scope of this invention.

What is claimed is:

1. A method for making papermakers fabric comprising:

providing a fabric having opposing ends and a body of selected caliper and permeability;

preparing said opposing fabric ends for molding including cutting said fabric to a selected length based upon a given set of machine requirements for papermaking equipment on which said fabric is to be used;

providing at least one selectively configured mold; and plastic injection molding a seam component on each prepared end of said fabric using said mold whereby mating engagement of said respective seam components with each other renders said fabric endless and defines a seam having a caliper substantially equal to said caliper of said fabric body.

2. The method according to claim 1 wherein said provided fabric is a woven fabric having machine direction yarns and cross machine direction yarns interwoven in a selected weave pattern wherein said preparing step includes removing selected cross machine direction yarns from said fabric ends to increase mechanical bonding between said fabric ends and said seam components in said papermakers fabric.

3. The method according to claim 1 further comprising creating a selected array of apertures through said molded seam components to provide said seam defined by said mating engagement of said respective components with a permeability substantially equal to said permeability of said body of said fabric.

4. The method according to claim 1 wherein two selectively configured molds are provided such that a first mold is used in said molding of said seam component on one end of said fabric and a second mold is used to mold said seam component on an opposite end of said fabric to define respective male and female seam components on said opposing fabric ends.

5. The method according to claim 4 wherein said molds in width are less than a width of said provided fabric and a plurality of plastic injection molding operations are performed with each mold on said opposite ends of said fabric to form said molded seam components.

6. The method according to claim 1 wherein nylon resin is used in said injection molding step and said resin is injection molded at a processing temperature in a range of 500°–570° Fahrenheit and a processing pressure in a range of 10,000–20,000 PSI.

7. A method for making a papermakers fabric comprising:

providing a fabric woven of machine direction and cross machine yarns, said woven fabric having a selected uniform caliper and permeability and said machine direction yarns having opposing ends which define opposing ends of said woven fabric;

affixing a seam component to each end of said fabric including:

preparing said opposing fabric ends for receiving a seam component on each said end by cutting said fabric to a selected length based upon a given set of machine requirements for papermaking equipment on which said fabric is to be used;

causing molten plastic material to flow about a selected length of said ends of said machine direction yarns;

confining said flow of molten plastic material such that said molten plastic material flows in a space substantially equal to said caliper of said fabric; and permitting said molten plastic material to solidify about said machine direction yarn ends such that said solidified plastic material has a caliper substantially equal to said caliper of said fabric and serves to couple a selectively configured seam component onto said fabric end.

8. A method according to claim 7 wherein said preparing step includes removing a selected number of said cross machine direction yarns from each end of said fabric thereby permitting more contact between said molten plastic material and said machine direction yarns.

9. A method according to claim 7 wherein said confining step includes providing at least one selectively configured mold into which at least a portion of said fabric ends is placed prior to causing said molten plastic to flow about said machine direction yarns which define said fabric end portion.

10. A method according to claim 9 wherein said mold is configured to form said seam component, the method further comprising:

forming said selectively configured seam component during said molten plastic flowing step.

11. A method according to claim 10 wherein said molten plastic flowing step, said confining step and said seam component forming step are performed by plastic injection molding.

* * * * *